United States Patent Office 3,487,066
Patented Dec. 30, 1969

3,487,066
WATER-INSOLUBLE MONOAZO PYRIDINE DYESTUFFS
Heinrich Ritter, Dornigheim, kreis Hanau, Ernst Heinrich, Frankfurt am Main-Fechenheim, Hanswilli von Brachel, Offenbach am Main, and Horst Kindler, Frankfurt am Main-Fechenheim, Germany, assignors to Cassella Farbwerke Mainkur Aktiengesellschaft, Frankfurt am Main-Fechenheim, Germany, a company of Germany
No Drawing. Filed Aug. 5, 1966, Ser. No. 570,428
Claims priority, application Germany, Aug. 13, 1965,
C 36,633; May 18, 1966, C 39,101
Int. Cl. C09b *29/00;* D06p
U.S. Cl. 260—156                       6 Claims

ABSTRACT OF THE DISCLOSURE

Water-insoluble azo dyestuffs having the following general formula

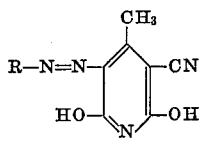

wherein R represents a substituted residue of the benzene series free from carboxylic or sulfonic acid groups are particularly suited for dyeing synthetics.

---

The present invention relates to azo dyes as above defined.

The residue R in the foregoing formula may be substituted once or several times by halogen, alkyl, alkoxy, trifluoromethyl, trichloromethyl, cyano, nitro, the residues —CO—$R_3$, —$SO_2$—$R_3$,

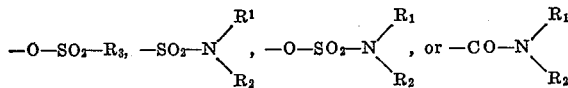

wherein $R_1$ and $R_2$ represent hydrogen, furthermore $R_1$, $R_2$, and $R_3$ designate alkyl, halogenoalkyl, cyanoalkyl, alkoxyalkyl, cycloalkyl, aralkyl or aryl and the alkyl radicals $R_1$ and $R_2$ may be linked with each other either directly or via a heteroatom.

These dyestuffs are obtained by coupling diazo compounds of amine of the benzene series having the general formula R—$NH_2$ with 2,6-dihydroxy-3-cyano-4-methyl-pyridine.

Particularly valuable dyestuffs are obtained by starting from those diazo compounds in which the sum of the atom weights of the atoms contained in the substituents of the benzene nucleus is greater than 70.

The 2,6-dihydroxy-3-cyano-4-methyl-pyridine required as a coupling component for the preparation of said dyestuffs is well known and its preparation which is done by reaction of ethyl acetoacetate and ethyl cyanoacetate with ammonia is described by: I. Guareschi, Berichte der Deutschen Chemischen Gesellschaft 29 (1896), volume of abstracts, page 655. The dyestuffs of the present invention are especially suited for the dyeing and printing of fabrics made from synthetic materials, such as, for example, cellulose acetate including cellulose triacetate, polyamide, and, in particular, polyester materials based for example on polyethyleneglycolterephthalate. When applied on these materials, they yield according to the known dyeing and printing processes, deep dyeings and full prints having very good fastness properties, in particular, a very good fastness to light and sublimation.

Dyeing of said fiber materials with the dyestuffs of the present invention is advantageously performed from an aqueous suspension, in the presence of carriers at temperatures between about 80 and 110° C., without carriers at temperatures between about 110 and 140° C. and according to the so-called process of thermofixing, at about 170–230° C. Printing of said materials may be effected by steaming the fabric printed with the dyestuffs of the present invention, in the presence of a carrier, at temperatures ranging from about 80 to 110° C. or without a carrier at temperatures between 110 and 140° C. or alternatively according to the so-called process of thermofixing, at about 170–230° C.

The aminophenyl sulfamates or aminophenyl sulfonates required, inter alia, as starting materials are preferably prepared by first reacting a nitrophenol with a suitable sulfamic acid chloride or sulfonic acid chloride and subsequently reducing in known manner, for example, by hydrogenation, the resultant nitrophenyl sulfamate or nitrophenyl sulfonate to give the corresponding amino compounds.

The following aminophenyl sulfamates can be prepared in said manner and used in the form of their diazo compounds:

2,3- or 4-aminophenyl sulfamate
2-amino-4,5- or -6-methylphenyl sulfamate
2-amino-4,5- or -4,6-dimethylphenyl sulfamate
2-amino-5-methoxyphenyl sulfamate
2-amino-4-chlorophenyl sulfamate
3-amino-4- or -6-methylphenyl sulfamate
3-amino-2,5-dimethylphenyl sulfamate
3-amino-6-chlorophenyl sulfamate
3-amino-2,6-dichlorophenyl sulfamate
4-amino-6-methylphenyl sulfamate
4-amino-2,6-dimethylphenyl sulfamate
4-amino-2- or -3-methoxyphenyl sulfamate
4-amino-6-chlorophenyl sulfamate or
4-amino-2,6-dichlorophenyl sulfamate The amino component of the sulfanate groups may be derived, for example, from ammonia, methylamine, ethylamine, 2-chloro-ethylamine, 2-ethoxy-ethylamine, 2-cyanoethylamine, n- or isopropylamine, n-, iso- or secondary butylamine, hexylamine, dimethylamine, diethylamine, di-n- or isopropylamine, di-n-, iso- or secondary butylamine, ethylene-imine, morpholine, piperidine, cyclohexylaniline, benzylamine, aniline, o-, m- or p-chloroaniline, o-, m- or p-toluidine, o-, m- or p-anisidine, N-methylaniline or N-ethylaniline.

Suitable aminophenyl sulfonates correspond to the general formula $R_3$—$SO_2$—O-phenylamine, where $R_3$ may have, for example, the following meaning: methyl, chloromethyl, ethyl, 1- or 2-chloroethyl, 2-ethoxyethyl, 2-cyanoethyl, n- or isopropyl, n-, iso- or secondary butyl, hexyl, cyclohexyl, benzyl, phenyl, 2-, 3- or 4-chlorophenyl, 2-, 3- or 4-methylphenyl or 2-, 3- or 4-methoxyphenyl and the ester component is derived from one of the following aminophenols:

2,3- or 4-aminophenol,
2-amino-4,5- or -6-methylphenol
2-amino-4,5- or -4,6-dimethylphenol
2-amino-5-methoxyphenol
2-amino-4-chlorophenol
3-amino-4- or -6-methylphenol
3-amino-2,5-dimethylphenol
3-amino-6-chlorophenol
3-amino-2,6-dichlorophenol
4-amino-6-methylphenol
4-amino-2,6-dimethylphenol
4-amino-2- or -3-methoxyphenol
4-amino-6-chlorophenol or
4-amino-2,6-dichlorophenol The following examples are given for the purpose of illustrating the present invention. Unless otherwise stated, all temperatures given are in degrees centigrade and all parts are parts by weight.

EXAMPLE 1

17.2 parts 2-chloro-4-nitroaniline are vigorously stirred for several hours together with 180 parts water and 36 parts hydrochloric acid of 30% and diazotized, at a temperature of 0 to +5°, with a solution of 7.7 parts sodium nitrite in 50 parts water. The limpid diazo solution is poured into a solution of 15.0 parts 2,6-dihydroxy-3-cyano-4-methylpyridine in 400 parts water and 60 parts sodium hydroxide solution of 33° Bé. and the reaction temperature during the coupling operation is kept at 0 to +5° by the addition of 500 parts ice. The coupling operation being terminated, the resultant dyestuff is precipitated by the addition of 50 parts acetic acid of 50%, filtered off with suction, washed with water until neutral, and dried. The dyestuff obtained is a yellow powder.

0.5 part of the dyestuff are, in the usual manner, brought into a sufficiently fine division and dispersed in 3000 parts water. Into the dyebath thus obtained are introduced 100 parts of a polyester fabric based on polyethyleneglycolterephthalate and dye for 1½ hours, at a temperature of 120–130°.

After subsequent rinsing followed by reductive aftertreatment with a 0.2% alkaline sodium dithionite solution for 15 minutes at 60–70°, and finishing in the usual manner, a reddish yellow dyeing is obtained having very good fastness properties, in particular, a very good fastness to light and sublimation.

Dyestuffs that yield dyeings of similar shades and likewise valuable tinctorial properties are obtained by replacing in paragraph 1 of this example the 2-chloro-4-nitroaniline used as diazo component by an equimolecular amount of one of the following amines of the benzene series:

2-bromo-4-nitroaniline
4-chloro-2-nitroaniline
3-nitro-4-amino-toluene
3-nitro-4-amino-anisol
5-nitro-4-amino-1,3-dimethylbenzene
4-amino-acetophenone
4-amino-phenyl-methyl-sulfone and
Ethyl 4-amino-benzoate In contrast, greenish yellow dyeings of likewise very good properties are obtained by using as diazo component:

2-nitroaniline
3-cyanoaniline

EXAMPLE 2

16.1 parts 3,4-dichloro-aniline are dissolved in 150 parts sulfuric acid of 66° Bé. and diazotized with external cooling, at 0 to +5°, by the addition of 34.0 parts nitrosyl sulfuric acid of 42%. After one hour's stirring, the sulfuric acid solution is decomposed by means of 700 parts ice at 0 to +5° and the resultant diazo solution is allowed to run into a solution of 15.0 parts 2,6-dihydroxy-3-cyano-4-methyl-pyridine in 400 parts water and 60 parts sodium hydroxide solution of 33° Bé. The coupling temperature is kept at 0 to +5° by the addition of 1000 parts ice and during the coupling operation the reaction is kept weakly alkaline by simultaneously adding 525 parts sodium hydroxide solution of 33° Bé. The coupling operation being terminated, the resultant dyestuff is precipitated by adding 100 parts acetic acid of 50%, then filtered off with suction, and dried to yield a yellow powder. 30 parts of the dyestuff (related to 1000 g. printing paste) in a finely divided form are incorporated into a printing paste which contains thickener and defoamer. When applying this printing paste onto a polyester fabric, after printing, drying, steaming for 15 minutes at 110°, rinsing and finishing in the usual manner, a greenish yellow print is obtained having very good fastness properties.

Dyestuffs that yield dyeings of similar shades and likewise very good tinctorial properties are obtained by using instead of the 3,4-dichloroaniline one of the following diazo components:

2,5-dichloroaniline
3,4,5-trichloroaniline
3-bromoaniline
2,5-dibromoaniline
3-trifluoromethyl-aniline
3-trichloromethyl-aniline

EXAMPLE 3

17.2 parts 4-aminobenzene-sulfonic acid amide are dissolved in 180 parts water with the addition of 36 parts hydrochloric acid of 30%, then diazotized as described in Example 1, coupled with 2,6-dihydroxy-3-cyano-4-methyl-pyridine, and the resulting dyestuff isolated as a yellow powder.

A fabric of polyethyleneglycolterephthalate is dyed on the padding machine with a liquor containing in 1000 parts padding liquor 9.0 parts of the finely divided dyestuff, thickener, and wetting agents. After drying, the dyestuff is fixed on the thermofixing frame at 215° for 60 seconds and the fabric subsequently subjected to a reductive aftertreatment as described in Example 1, and finished in the usual manner. Thus, a deep, clear, greenish yellow dyeing is obtained having excellent fastness properties, in particular an excellent fastness to light and sublimation.

Dyestuffs that yield dyeings of similar shades and fastness properties are obtained by using as diazo component in the above example one of the following compounds:

4-aminobenzene-sulfonic acid-dimethylamide
4-aminobenzene-sulfonic acid-piperidine
3-aminobenzene-sulfonic acid amide
3-aminobenzene-sulfonic acid diethylolamide
3-aminobenzene-sulfonic acid ethylenimide
3-aminobenzene-sulfonic acid morpholide
2-aminobenzene-sulfonic acid methylamide
4-amino-benzoic acid dimethylamide
3-amino-benzoic acid amide

EXAMPLE 4

21.6 parts 3-aminophenyl dimethylsulfamate are dissolved in 280 parts water with the addition of 36 parts hydrochloric acid of 30% and the mixture is then diazotized, at 0 to +5°, with a solution of 7.7 parts sodium nitrite in 50 parts water. The limpid diazo solution is allowed to run into a solution of 15.0 parts 2,6-dihydroxy - 3-cyano-4-methylpyridine in 400 parts water and 60 parts sodium hydroxide solution of 33° Bé. and the reaction temperature during the coupling operation is kept at 0 to +5° by the addition of 500 parts ice. The coupling operation being terminated, the resultant dyestuff is precipitated by adding 50 parts acetic acid of 50%, filtered off with suction, washed with water until neutral, and dried. The dyestuff obtained is a yellow powder that dissolves in concentrated sulfuric acid with a reddish yellow colour.

0.5 parts of the dyestuff are brought in the usual manner, into a sufficiently fine division and dispersed in 3000 parts water. Thereafter, 100 parts of a polyester fabric based on polyethyleneglycolterephthalate are introduced into the dyebath thus obtained and dyed for 1½ hours at 120–130°.

After subsequent rinsing followed by reductive aftertreatment with a 0.2% alkaline sodium dithionite solution for 15 minutes at 60–70° and finishing in the usual manner, a greenish yellow dyeing is obtained having very good fastness properties, in particular a very good fastness to light and sublimation.

Dyestuffs that yield dyeings of similar shades and likewise valuable tinctorial properties are obtained by replacing the 3-aminophenyl dimethylsulfamate used as a diazo, component by an equimolecular amount of one of the following amines of the benzene series:

2-aminophenyl dimethylsulfamate
2-aminophenyl di-n-butylsulfamate
2-amino-4-chlorophenyl dimethylsulfamate
3-aminophenyl sulfamate
3-aminophenyl n-propylsulfamate
3-aminophenyl dimethylsulfamate
3-aminophenyl di-n-butylsulfamate
3-aminophenyl morpholine-N-sulfonate having the formula

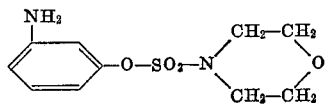

3-aminophenyl piperidine-N-sulfonate having the formula

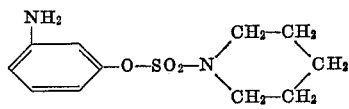

3-aminophenyl cyclohexylsulfamate
3-aminophenyl N-methylaniline-N-sulfonate having the formula

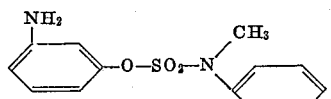

3-amino-6-methylphenyl diethylsulfamate
4-aminophenyl ethylene-imine-N-sulfonate having the formula

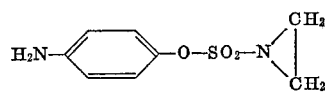

4-aminophenyl dimethylsulfamate
4-amino-2,6-dimethylphenyl dimethylsulfamate

EXAMPLE 5

21.5 parts 3-aminophenyl n-propylsulfonate are dissolved in 280 parts water with the addition of 36 parts hydrochloric acid of 30%, then diazotized as described in Example 1, coupled with 2,6-dihydroxy - 3-cyano-4-methylpyridine and the resultant dyestuff is isolated. It is a yellow powder that dissolves in concentrated sulfuric acid with a yellow olive color.

30 parts of the dyestuff (related to 1000 g. printing paste) in a finely divided form are incorporated into a printing paste containing, in addition to thickener and defoamer, 15 parts of the sodium salt of a sulfonated castor oil of about 50%. When this printing paste is applied onto a polyester fabric, after printing, drying and fixing on the thermofixing frame during 60 seconds at 215°, rinsing, and finishing in the usual manner, a greenish yellow print is obtained having very good fastness properties.

Dyestuffs that yield dyeings of similar shades and likewise very good tinctorial properties are obtained by using instead of the 3-aminophenyl n-propyl-sulfonate one of the following diazo components:

2-aminophenyl methylsulfonate
2-aminophenyl β-chloro-ethylsulfonate
2-amino-4-methylphenyl n-butylsulfonate
2-amino-4,6-dimethylphenyl ethylsulfonate
3-aminophenyl methylsulfonate
3-aminophenyl ethylsulfonate
3-aminophenyl β-cyanoethylsulfonate
3-aminophenyl n-butylsulfonate
3-aminophenyl n-hexylsulfonate
3-aminophenyl phenylsulfonate
3-aminophenyl benzylsulfonate
3-amino-4-methylphenyl ethylsulfonate
4-aminophenyl methylsulfonate
4-aminophenyl β-ethoxyethylsulfonate
4-aminophenyl n-propylsulfonate
4-amino-2,6-dimethylphenyl methylsulfonate
4-amino-6-methylphenyl n-hexylsulfonate
4-amino-2-methoxyphenyl methylsulfonate

We claim:
ethoxy, —CF₃, —CCl₃; —CN, —NO₂, acetyl or methylsulfonyl, R₁₃ is a hydrogen atom, chlorine, bromine, methyl, methoxy, ethoxy, —CN or —NO₂, and R₁₄ is a hydrogen atom, chlorine, bromine or methyl.

1. A water-insoluble azo dyestuff having the formula

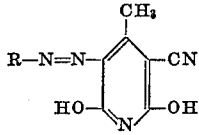

wherein R is mono-, di- or tri-substituted phenyl whose substituents are selected from the group consisting of chlorine, bromine, lower alkyl, lower alkoxy, trifluoromethyl, trichloromethyl, cyano, nitro, —COR₃, —SO₂R₃, —OSO₂R₃, —SO₂NR₁R₂, —OSO₂NR₁R₂ and —CONR₁R₂ wherein R₃ is lower alkyl, hydroxy lower alkyl, chloro-lower-alkyl, bromo-lower-alkyl, cyano-lower-alkyl, lower alkoxy-alkyl, benzyl or phenyl and R₁ and R₂ are hydrogen, cyclohexyl or any of the R₃ radicals or together with the adjacent nitrogen atom in —SO₂NR₁R₂ and —OSO₂NR₁R₂ are

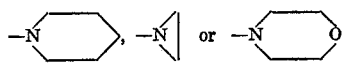

2. A water-insoluble azo dyestuff as claimed in claim 9 having the formula

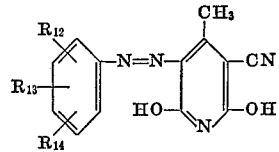

wherein R₁₂ is chlorine, bromine, methyl, methoxy, ethoxy, —CF₃, —CCl₃, CN, —NO₂, acetyl or methylsulfonyl, R₁₃ is a hydrogen atom, chlorine, bromine, methyl, methoxy, ethoxy, —CN or —NO₂, and R₁₄ is a hydrogen atom, chlorine, bromine or methyl.

3. A water-insoluble azo dyestuff as claimed in claim 1 having the formula

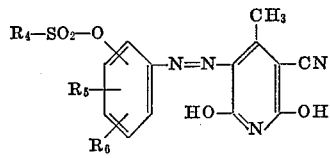

wherein R₄ is an alkyl radical having between 1 and 6 carbon atoms, chloroethyl, cyanoethyl, methoxyethyl, ethoxyethyl, benzyl or phenyl, R₅ is a hydrogen atom, methyl or methoxy, and R₆ is a hydrogen atom or methyl.

4. A water-insoluble azo dyestuff as claimed in claim 1 having the formula

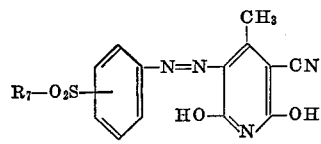

wherein $R_7$ is

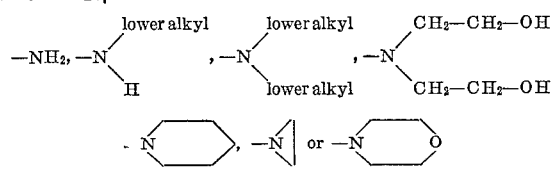

5. A water-insoluble azo dyestuff as claimed in claim 1 having the formula

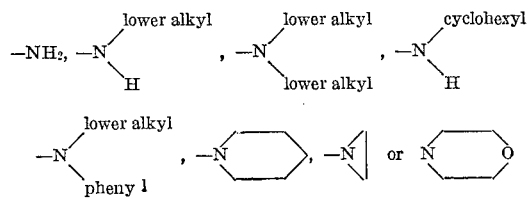

wherein $R_8$ is

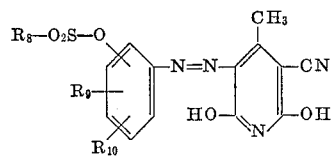

$R_9$ is a hydrogen atom, methyl or chlorine and $R_{10}$ is a hydrogen atom or methyl.

6. A water-insoluble azo dyestuff as claimed in claim 1 having the formula

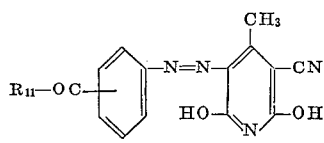

wherein $R_{11}$ is ethoxy,

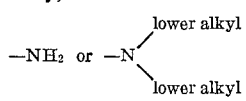

References Cited

UNITED STATES PATENTS 3,312,681   4/1967   Lewis _____ 260—156

CHARLES B. PARKER, Primary Examiner

D. M. PAPUGA, Assistant Examiner

U.S. Cl. X.R.

8—41, 55; 260—239, 247.1, 293.4, 456